United States Patent
Zeng et al.

(10) Patent No.: US 10,278,147 B2
(45) Date of Patent: Apr. 30, 2019

(54) METHOD FOR DETERMINING MEASUREMENT GAP LENGTH AND NETWORK DEVICE

(71) Applicant: Huawei Technologies Co., Ltd., Shenzhen, Guangdong (CN)

(72) Inventors: Qinghai Zeng, Shanghai (CN); Yi Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 15/416,759

(22) Filed: Jan. 26, 2017

(65) Prior Publication Data

US 2017/0150462 A1    May 25, 2017

Related U.S. Application Data

(63) Continuation of application No. PCT/CN2014/083311, filed on Jul. 30, 2014.

(51) Int. Cl.
*H04W 56/00* (2009.01)
*H04W 24/00* (2009.01)
(Continued)

(52) U.S. Cl.
CPC ......... *H04W 56/001* (2013.01); *H04W 24/00* (2013.01); *H04W 24/04* (2013.01);
(Continued)

(58) Field of Classification Search
CPC ... H04W 56/001; H04W 24/00; H04W 24/04; H04W 24/10; H04W 36/0088; H04W 84/045
See application file for complete search history.

(56) References Cited

U.S. PATENT DOCUMENTS

2010/0034158 A1* 2/2010 Meylan ............... H04L 1/1854
                                                             370/329
2011/0205928 A1* 8/2011 Pelletier ............... H04L 1/1883
                                                             370/252
(Continued)

FOREIGN PATENT DOCUMENTS

CN      101043697 A     9/2007
CN      101321363 A    12/2008
(Continued)

OTHER PUBLICATIONS

Ericsson, "Acquisition of SeNB SFN in the dual connectivity", 3GPP TSG RAN WG4 Meeting #71, May 19-23, 2014, 3 pages, R4-142726.
(Continued)

*Primary Examiner* — Ajay Cattungal

(57) ABSTRACT

Embodiments of the present invention provide a method for determining a measurement gap length and a network device. The method includes the following steps: determining, by a first network device, whether a master eNodeB is synchronous with a secondary eNodeB; and when the master eNodeB is synchronous with the secondary eNodeB, determining, by the first network device, that the measurement gap length is a first length; or when the master eNodeB is not synchronous with the secondary eNodeB, determining, by the first network device, that the measurement gap length is a second length; where the first length is less than the second length.

21 Claims, 10 Drawing Sheets

(51) Int. Cl.
*H04W 36/00* (2009.01)
*H04W 24/04* (2009.01)
*H04W 24/10* (2009.01)
*H04W 84/04* (2009.01)

(52) U.S. Cl.
CPC ........ *H04W 36/0088* (2013.01); *H04W 24/10* (2013.01); *H04W 84/045* (2013.01)

(56) References Cited

U.S. PATENT DOCUMENTS

| | | | | |
|---|---|---|---|---|
| 2012/0281563 | A1* | 11/2012 | Comsa | H04W 24/10 370/252 |
| 2013/0258913 | A1* | 10/2013 | Challa | H04J 3/06 370/280 |
| 2014/0094188 | A1* | 4/2014 | Kazmi | G01S 5/0242 455/456.1 |
| 2014/0362832 | A1* | 12/2014 | Rudolf | H04L 1/1822 370/336 |
| 2015/0373571 | A1* | 12/2015 | Chincholi | H04W 16/14 370/330 |
| 2016/0014706 | A1* | 1/2016 | Vajapeyam | H04W 56/001 370/328 |
| 2017/0048108 | A1* | 2/2017 | Yi | H04W 56/00 |
| 2017/0134976 | A1 | 5/2017 | Uchino et al. | |

FOREIGN PATENT DOCUMENTS

| | | |
|---|---|---|
| CN | 101335975 A | 12/2008 |
| CN | 101778403 A | 7/2010 |
| CN | 102595450 A | 7/2012 |
| EP | 3160182 A1 | 4/2017 |
| JP | 2017525274 A | 8/2017 |
| WO | 2011/102769 A1 | 8/2011 |
| WO | 2015/167303 A1 | 11/2015 |
| WO | 2015194570 A1 | 12/2015 |
| WO | 2016007269 A1 | 1/2016 |

OTHER PUBLICATIONS

Intel Corporation, "Discussion on SFN timing difference in Dual connectivity", 3GPP TSG-RAN WG4 Meeting #71, May 19-23, 2014, 7 pages, R4-143028.

Qualcomm Inc., "Measurement gap configuration in Dual Connectivity", 3GPP TSG-RAN WG2 meeting #86, May 19-23, 2014, 3 pages, R2-142517.

Huawei, HiSilicon, "RRM measurements for SCG in dual connectivity", 3GPP TSG-RAN WG2 Meeting #86, May 19-23, 2014, 5 pages, R2-142066.

Huawei, "SFN Handling in Dual Connectivity"; 3GPP TSG-RAN WG3 Meeting #84; R3-141068; Seoul, Korea; May 19-23, 2014; 3 pages.

Huawei et al.; "Discussion on RRM measurement gap in DC scenario;" 3GPP TSG RAN WG4 Meeting #71AH; R4-71AH-0005; Beijing, P.R. China; Jun. 24-26, 2014; 2 pages.

Intel Corporation; "Further discussion on SFN timing difference in Dual connectivity"; 3GPP TSG RAN WG4 Meeting #71 RRM AH; Beijing, P.R. China; Jun. 24-26, 2014; 3 pages.

* cited by examiner

METHOD FOR DETERMINING MEASUREMENT GAP LENGTH AND NETWORK DEVICE

CROSS-REFERENCE TO RELATED APPLICATIONS

This application is a continuation of International Application No. PCT/CN2014/083311, filed on Jul. 30, 2014, the disclosure of which is hereby incorporated by reference in its entirety.

TECHNICAL FIELD

The present invention relates to the field of communications technologies, and in particular, to a method for determining a measurement gap length and a network device.

BACKGROUND

A radio access technology of a wireless cellular mobile network is developing continuously, and an objective of the radio access technology is to meet user requirements for a higher rate, wider coverage, and a larger capacity in the future. Currently, the technology is evolving from a 3G system to long term evolution (LTE) system, and is further evolving to an LTE-Advanced system. In an LTE system, a network sends, by using radio resource control protocol (Radio Resource Control, RRC) signaling, measurement configuration information to UE that is in a connected state; and the UE performs measurement according to content of the measurement configuration information, and then reports a measurement result to the network. If a primary frequency of a target cell is the same as a primary frequency of a serving cell of the UE, measurement of the UE is referred to as intra-frequency measurement; if a primary frequency of a target cell is different from a primary frequency of a serving cell of the UE, measurement of the UE is referred to as inter-frequency measurement. When performing the inter-frequency measurement, the UE may need to adjust a radio frequency to a location in which the frequency is located. Consequently, data cannot be sent or received on a serving frequency.

UE generally has only one receiver, and therefore can receive a signal on only one frequency at a time. Before inter-frequency inter-system handover is performed, inter-frequency measurement needs to be performed first. Therefore, a measurement gap (GAP), that is, a period of time in which the UE leaves a current frequency and performs measurement on another frequency, is required. When the inter-frequency measurement is performed, an eNB configures an inter-frequency measurement gap (GAP), which is specifically determined by two parameters, that is, a gap pattern and a gap offset (gapOffset). LTE supports two gap patterns, that is, a pattern 0 and a pattern 1. Measurement gap repetition periods (MGRP) of the pattern 0 and the pattern 1 are respectively 40 ms and 80 ms. A start location of each GAP, that is, a system frame number (SFN) and a subframe number (subframe), meets the following relationship:

SFN mod $T$=FLOOR(gapOffset/10);

subframe=gapOffset mod 10;

where T=MGRP/10.

Measurement GAP lengths are uniformly defined as 6 ms. To synchronize with a measured target cell, at least the following is needed: frequency handover duration (1 ms) of a receiver+(duration of primary and secondary synchronization signals+signal measurement duration) (5 ms), which are about 6 ms. After receiving information of a gap pattern and a gap offset from the eNB, the UE calculates, according to the foregoing formula, a start point of a subframe location for the inter-frequency measurement; and performs the inter-frequency measurement on six consecutive subframes starting from a start subframe. The UE neither receives data transmitted over a physical downlink control channel (PDCCH) nor sends uplink data in a gap location. Therefore, a network does not schedule the UE in a GAP period.

Currently, dual connectivity (DC) is being discussed, that is, user equipment (UE) may simultaneously connect to a master eNodeB (MeNB) and a secondary eNodeB (SeNB) to transmit data, thereby improving a throughput of the UE. In a dual connectivity scenario, a case in which a scheduling resource is wasted occurs.

SUMMARY

In view of this, embodiments of the present invention provide a method for determining a measurement gap length and a network device. The method can be used in a dual connectivity scenario to determine an appropriate measurement GAP length, so as to effectively avoid waste of a scheduling resource caused by selection of an inappropriate GAP length.

According to a first aspect, an embodiment of the present invention provides a method for determining a measurement gap length, where the method includes:

determining, by a first network device, whether a master eNodeB is synchronous with a secondary eNodeB; and when the master eNodeB is synchronous with the secondary eNodeB, determining, by the first network device, that the GAP length is a first length; or when the master eNodeB is not synchronous with the secondary eNodeB, determining, by the first network device, that the GAP length is a second length; where the first length is less than the second length.

In a first possible implementation manner, the method further includes:

obtaining, by the first network device, indication information that is used to indicate whether the master eNodeB is synchronous with the secondary eNodeB; where the determining, by a first network device, whether a master eNodeB is synchronous with a secondary eNodeB includes:

determining, by the first network device according to the indication information, whether the master eNodeB is synchronous with the secondary eNodeB.

In a second possible implementation manner, the method further includes:

obtaining, by the first network device, SFN deviation information that is used to indicate a system frame number SFN deviation between the master eNodeB and the secondary eNodeB; where the determining, by a first network device, whether a master eNodeB is synchronous with a secondary eNodeB includes:

determining, by the first network device according to the SFN deviation information, whether the SFN deviation meets a synchronization condition, where when the SFN deviation meets the synchronization condition, the master eNodeB is synchronous with the secondary eNodeB, or when the SFN deviation does not meet the synchronization condition, the master eNodeB is not synchronous with the secondary eNodeB.

With reference to the second possible implementation manner of the first aspect, in a third possible implementation manner, the synchronization condition includes:

the SFN deviation is 0; or the SFN deviation is less than a first threshold.

With reference to the second or the third possible implementation manner of the first aspect, in a fourth possible implementation manner, the obtaining, by the first network device, SFN deviation information that is used to indicate an SFN deviation between the master eNodeB and the secondary eNodeB includes:

obtaining, by the first network device, the SFN deviation information according to an initial time of an SFN of the master eNodeB and an initial time of an SFN of the secondary eNodeB; or obtaining, by the first network device, the SFN deviation information from a second network device, where the SFN deviation information is obtained according to an initial time of an SFN of the master eNodeB and an initial time of an SFN of the secondary eNodeB.

With reference to the first aspect, or the first, the second, the third, or the fourth possible implementation manner of the first aspect, in a fifth possible implementation manner, the first network device is the master eNodeB, the secondary eNodeB, or the UE.

With reference to the fourth or the fifth possible implementation manner of the first aspect, in a sixth possible implementation manner, the method further includes:

obtaining, by the first network device, a calculation error of the SFN deviation; where when the calculation error of the SFN deviation is not greater than a second threshold, the second length is 7 ms; or when the calculation error of the SFN deviation is greater than the second threshold, the second length is 8 ms.

According to a second aspect, an embodiment of the present invention provides a network device, including a processing unit and a storage unit, where the processing unit is configured to:

determine whether a master eNodeB is synchronous with a secondary eNodeB; and when the master eNodeB is synchronous with the secondary eNodeB, determine that the GAP length is a first length; or when the master eNodeB is not synchronous with the secondary eNodeB, determine that the GAP length is a second length; where the first length is less than the second length; and the storage unit is configured to store the GAP length.

In a first possible implementation manner, the network device further includes: a communications unit, configured to communicate with another network device;

the processing unit is further configured to obtain, by using the communications unit, indication information that is used to indicate whether the master eNodeB is synchronous with the secondary eNodeB; and the processing unit that is configured to determine whether the master eNodeB is synchronous with the secondary eNodeB is specifically configured to determine, according to the indication information, whether the master eNodeB is synchronous with the secondary eNodeB.

In a second possible implementation manner, the processing unit is further configured to obtain SFN deviation information that is used to indicate a system frame number SFN deviation between the master eNodeB and the secondary eNodeB; and the processing unit that is configured to determine whether the master eNodeB is synchronous with the secondary eNodeB is specifically configured to determine, according to the SFN deviation information, whether the SFN deviation meets a synchronization condition, where when the SFN deviation meets the synchronization condition, the master eNodeB is synchronous with the secondary eNodeB, or when the SFN deviation does not meet the synchronization condition, the master eNodeB is not synchronous with the secondary eNodeB.

With reference to the second possible implementation manner of the second aspect, in a third possible implementation manner, the synchronization condition includes:

the SFN deviation is 0; or the SFN deviation is less than a first threshold.

With reference to the second or the third possible implementation manner of the second aspect, in a fourth possible implementation manner, the processing unit that is configured to obtain the SFN deviation information is specifically configured to obtain the SFN deviation information according to an initial time of an SFN of the master eNodeB and an initial time of an SFN of the secondary eNodeB; or the network device further includes: a communications unit, configured to communicate with another network device; and the processing unit that is configured to obtain the SFN deviation information is specifically configured to obtain the SFN deviation information from the another network device by using the communications unit, and the SFN deviation information is obtained according to an initial time of an SFN of the master eNodeB and an initial time of an SFN of the secondary eNodeB.

With reference to the second aspect, or the first, the second, the third, or the fourth possible implementation manner of the second aspect, in a fifth possible implementation manner, the network device is the master eNodeB, the secondary eNodeB, or the UE.

With reference to the fourth or the fifth possible implementation manner of the second aspect, in a sixth possible implementation manner, the network device further includes: an error obtaining unit, configured to obtain a calculation error of the SFN deviation; and a second-length determining unit, configured to: when the calculation error of the SFN deviation is not greater than a second threshold, determine that the second length is 7 ms; or when the calculation error of the SFN deviation is greater than the second threshold, determine that the second length is 8 ms.

By using the method for determining a measurement gap length provided in the embodiments of the present invention, a case in which a master eNodeB is synchronous or not synchronous with a secondary eNodeB is fully considered in a dual connectivity scenario, so that an appropriate measurement GAP length can be determined based on a synchronization or non-synchronization scenario, which effectively avoids waste of a scheduling resource caused by selection of an inappropriate GAP length.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following describes the embodiments of the present invention in detail with reference to accompanying drawings. It should be clear that the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
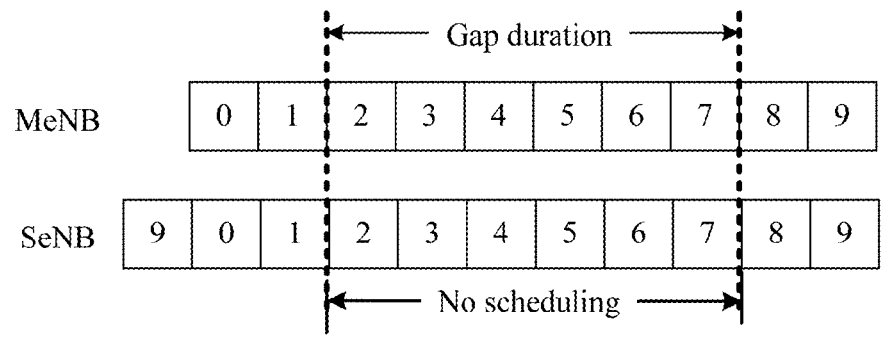
FIG. 1 is a schematic diagram of frame boundary synchronization of an MeNB and an SeNB according to the present invention.
Figure 2:
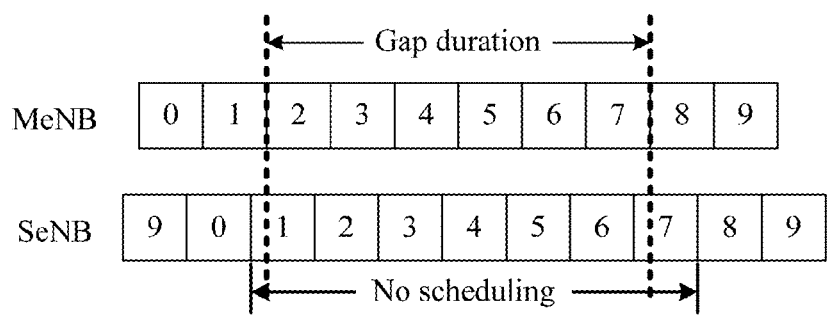
FIG. 2 is a schematic diagram of frame boundary non-synchronization of an MeNB and an SeNB according to the present invention.

Embodiment 1 of the present invention provides a method for determining a measurement gap length, which may be applied in a dual connectivity scenario. In the dual connectivity scenario, user equipment (UE) may simultaneously connect to a master eNodeB (MeNB) and a secondary eNodeB (SeNB) to transmit data. In a discussion about dual connectivity, for a dual connectivity deployment scenario, a case in which the MeNB is synchronous or not synchronous with the SeNB exists. A synchronization scenario means that system frame numbers and subframe numbers between two base stations (MeNB and SeNB) are aligned, which may be specifically shown in FIG. 1. Both SFNs and subframes of the MeNB and the SeNB are boundary synchronized. Therefore, in the synchronization scenario, an original gap mechanism may be reused. However, in a non-synchronization scenario, the system frame numbers of the MeNB and the SeNB may not be aligned, and the subframe numbers of the MeNB and the SeNB may not be aligned. Using a case shown in FIG. 2 as an example, subframes 2 to 7 of 6 ms in total of the MeNB are a gap of the UE, and UE performs inter-frequency measurement in the 6 ms. The MeNB is not synchronous with the SeNB. Therefore, for the SeNB, actually, the UE performs inter-frequency measurement in a part of a subframe 1 and a part of a subframe 7. In a GAP period, because the UE cannot receive serving frequency information, the UE cannot receive information of the subframe 1 and the subframe 7 that are of the secondary eNodeB. Consequently, although the UE does not perform measurement in a whole time of the subframe 1 or a whole time of the subframe 7, the subframe cannot be used to transmit information. Therefore, for a dual connectivity non-synchronization scenario, if a GAP is set to 6 ms with reference to a time sequence of the master eNodeB, the secondary eNodeB may fail to perform scheduling when the UE performs measurement at some moments of a subframe, so that a GAP is uniformly set to 7 ms or 8 ms, which causes waste of a scheduling resource.

Figure 3:
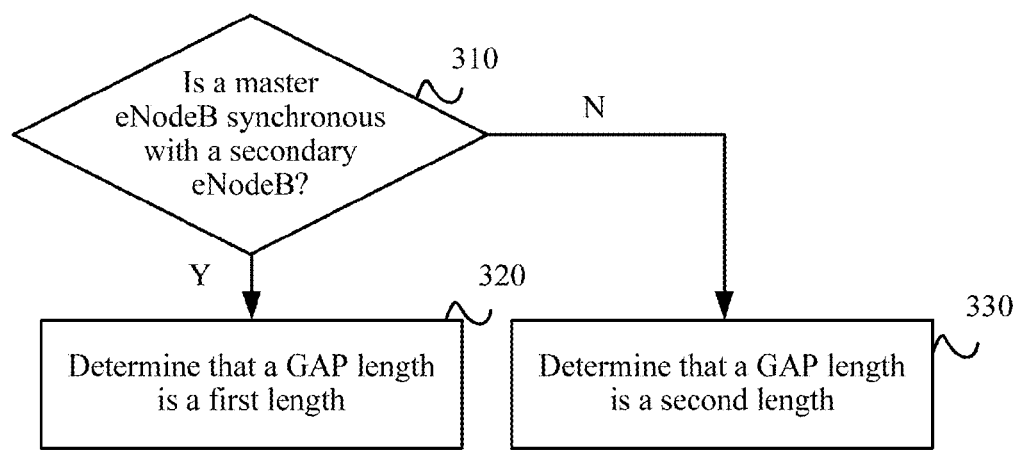
FIG. 3 is a flowchart of a method for determining a measurement gap length according to Embodiment 1 of the present invention.

FIG. 3 is a flowchart of a method for determining a measurement gap length according to Embodiment 1 of the present invention. As shown in FIG. 3, the method includes:

Step 310: A first network device determines whether a master eNodeB is synchronous with a secondary eNodeB.

The first network device may be specifically a master base station, a secondary eNodeB, or UE in a dual connectivity scenario. For different executors, a specific execution process of a solution is different. In the following method embodiments, base station side and UE side are separately used as executors for detailed description.

In a dual connectivity system, a case in which the master eNodeB is synchronous or not synchronous with the secondary eNodeB exists. When the master eNodeB is synchronous with the secondary eNodeB, step 320 is performed; or when the master eNodeB is not synchronous with the secondary eNodeB, step 330 is performed.

Step 320: When the master eNodeB is synchronous with the secondary eNodeB, the first network device determines that the GAP length is a first length.

Step 330: When the master eNodeB is not synchronous with the secondary eNodeB, the first network device determines that the GAP length is a second length.

The first length is less than the second length. The first length is a GAP length when the master eNodeB is synchronous with the secondary eNodeB, which is 6 ms; and the second length is a GAP length when the master eNodeB is not synchronous with the secondary eNodeB, which is set to 7 ms or 8 ms in this embodiment of the present invention.

Optionally, the method further includes:

obtaining, by the first network device, SFN deviation information that is used to indicate a system frame number SFN deviation between the master eNodeB and the secondary eNodeB.

Specifically, the first network device obtains the SFN deviation information according to an initial time of an SFN of the master eNodeB and an initial time of an SFN of the secondary eNodeB; or the first network device obtains the SFN deviation information from a second network device, where the SFN deviation information is obtained according to an SFN of the master eNodeB and an SFN of the secondary eNodeB.

The second network device refers to a peer device of the first network device. For example, when the first network device is the UE, the second network device may include the master eNodeB and/or the secondary eNodeB; when the first network device is the master eNodeB, the second network device may include the UE and/or the secondary eNodeB; or when the first network device is the secondary eNodeB, the second network device may include the master eNodeB and/or the UE.

Further, the first network device may further determine whether the second length is 7 ms or 8 ms according to the obtained calculation error of the SFN deviation. Optionally, when the calculation error of the SFN deviation is not greater than a second threshold, the second length is 7 ms; or when the calculation error of the SFN deviation is greater than the second threshold, the second length is 8 ms. The second threshold may be preferably set to 0.5 ms.

Optionally, the method further includes:

obtaining, by the first network device, indication information that is used to indicate whether the master eNodeB is synchronous with the secondary eNodeB, where the indication information may include configuration information obtained by the master eNodeB or the secondary eNodeB, or information indicating whether the master eNodeB is synchronous with the secondary eNodeB obtained by the UE by calculating the SFN deviation.

That a first network device determines whether a master eNodeB is synchronous with a secondary eNodeB includes:

determining, by the first network device according to the indication information, whether the master eNodeB is synchronous with the secondary eNodeB.

Further, that a first network device determines whether a master eNodeB is synchronous with a secondary eNodeB includes:

determining, by the first network device according to the SFN deviation information, whether the SFN deviation meets a synchronization condition, where when the SFN deviation meets the synchronization condition, the master eNodeB is synchronous with the secondary eNodeB, or when the SFN deviation does not meet the synchronization condition, the master eNodeB is not synchronous with the secondary eNodeB.

In addition, after determining of a GAP length, the method further includes:

indicating, by the first network device, the GAP length to the second network device.

By using the method for determining a measurement gap length provided in this embodiment of the present invention, a case in which a master eNodeB is synchronous or not synchronous with a secondary eNodeB is fully considered in a dual connectivity scenario, so that an appropriate measurement GAP length can be determined based on a synchronization or non-synchronization scenario, which effectively avoids waste of a scheduling resource caused by selection of an inappropriate GAP length. In the following Embodiment 2 and Embodiment 3, a master eNodeB/a secondary eNodeB and UE are separately used as executors for detailed description of the method provided in Embodiment 1 of the present invention.

Embodiment 2

Figure 4:
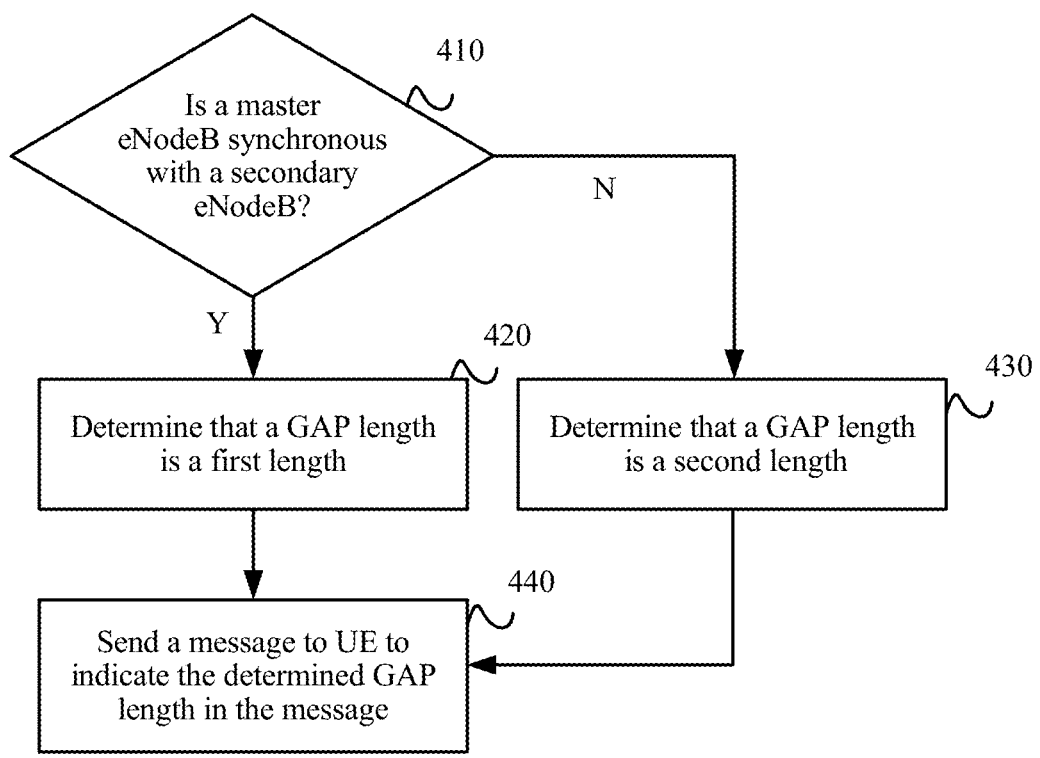
FIG. 4 is a flowchart of a method for determining a measurement gap length according to Embodiment 2 of the present invention.

Embodiment 2 of the present invention provides a method for determining a measurement gap length. FIG. 4 is a flowchart of a method for determining a measurement gap length according to an embodiment of the present invention. In this embodiment, the method is executed by a base station, which may be specifically a master eNodeB (MeNB) or a secondary eNodeB (SeNB). Unless specially noted in the following, the method provided in Embodiment 2 of the present invention may be executed by either of the two base stations: the MeNB and the SeNB. The method specifically includes the following steps:

Step 410: Determine that the master eNodeB is synchronous with the secondary eNodeB.

Specifically, at least the following three methods can be used to determine whether frame boundaries of the master eNodeB and the secondary eNodeB are synchronized.

Method 1, including:

S1-1: Obtain configuration information of the master eNodeB and the secondary eNodeB.

Specifically, configuration of the master eNodeB and the secondary eNodeB may be performed by means of network management or by means of or operation and maintenance of a base station. Therefore, whether the master eNodeB is synchronous with the secondary eNodeB is preset in configuration information of the base station.

S1-2: Determine whether the frame boundaries of the master eNodeB and the secondary eNodeB are synchronous according to the configuration information of the master eNodeB and the secondary eNodeB.

Specifically, if system frame numbers of the master eNodeB and the secondary eNodeB are aligned, that is, frame boundaries of system frame numbers of the master eNodeB and the secondary eNodeB are synchronized, it is considered that the master eNodeB is synchronous with the secondary eNodeB.

Method 2, including:

S2-1: Transfer an initial time of a system frame number (SFN) of the master eNodeB and an initial time of a system frame number SFN of the secondary eNodeB.

Specifically, on a network, transferring of an SFN may be performed between the master eNodeB and the secondary eNodeB. By means of the transferring, the master eNodeB may obtain the initial time of the SFN of the secondary eNodeB, and the secondary eNodeB may obtain the initial time of the SFN of the master eNodeB.

S2-2: Determine an SFN deviation between the master eNodeB and the secondary eNodeB according to the initial time of the SFN of the master eNodeB and the initial time of the SFN of the secondary eNodeB.

Specifically, the SFN deviation between the master eNodeB and the secondary eNodeB may be calculated according to the obtained initial time of the SFN of the master eNodeB and the obtained initial time of the SFN of the secondary eNodeB.

S2-3: Determine whether the SFN deviation is 0.

Specifically, if it is in a synchronization scenario, the SFN deviation between the master eNodeB and the secondary eNodeB should be 0. When the SFN deviation is 0, it can be considered that the frame boundaries of the master eNodeB and the secondary eNodeB are synchronized, and S2-4 is subsequently performed. When the SFN deviation is not 0, it is considered that the frame boundaries of the master eNodeB and the secondary eNodeB are not synchronized, and S2-5 is subsequently performed. Considering an effect caused by a system error, the SFN deviation may also be an excessively small deviation that is close to 0, for example, 30.26 μs.

S2-4: When the SFN deviation is 0, determine that the frame boundaries of the master eNodeB and the secondary eNodeB are synchronized.

S2-5: When the SFN deviation is not 0, determine that the frame boundaries of the master eNodeB and the secondary eNodeB are not synchronized.

Method 3, including:

S3-1: Receive information sent by UE, where the information includes an SFN deviation.

Specifically, the UE may implicitly obtain two lower bits of an SFN by performing decoding on a physical broadcast channel (PBCH) of the master eNodeB, and obtain a part of the SFN (eight higher bits) from a system message, so as to obtain an entire SFN of the master eNodeB; in addition, the UE may implicitly obtain two lower bits of an SFN by performing decoding on a PBCH of the secondary eNodeB, and obtain a part of the SFN (eight higher bits) from a system message, so as to obtain an entire SFN of the secondary eNodeB. After separately obtaining the SFN of the master eNodeB and the SFN of the secondary eNodeB, the UE may calculate the SFN deviation.

S3-2: Determine whether the SFN deviation is less than a first threshold.

Specifically, if it is in a synchronization scenario, the SFN deviation between the master eNodeB and the secondary eNodeB should be 0. Considering an effect caused by a system error, the SFN deviation may also be an excessively small deviation that is close to 0, for example, 30.26 μs, which is referred to as a first threshold. When the SFN deviation is less than the first threshold, it can be considered that the frame boundaries of the master eNodeB and the secondary eNodeB are synchronized, and S3-3 is subsequently performed. If the SFN deviation falls beyond the first threshold range, it is considered that the frame boundaries of the master eNodeB and the secondary eNodeB are not synchronized, and S3-4 is subsequently performed.

S3-3: When the SFN deviation is less than the first threshold, determine that the frame boundaries of the master eNodeB and the secondary eNodeB are synchronized.

S3-4: When the SFN deviation is not less than the first threshold, determine that the frame boundaries of the master eNodeB and the secondary eNodeB are not synchronized.

Based on the foregoing method, if the frame boundaries of the master eNodeB and the secondary eNodeB are synchronized, the following step 420 is performed; or if the frame boundaries of the master eNodeB and the secondary eNodeB are not synchronized, step 430 is performed.

In addition, if a case in which a current network scenario is a non-synchronization scenario is learned by using Method 1 and Method 2, the master eNodeB may send instruction information to instruct the UE to read a system message of the secondary eNodeB, so as to obtain the SFN of the secondary eNodeB. If it is in a synchronization scenario, the master eNodeB may send information to instruct the UE not to obtain the SFN of the secondary eNodeB.

Step 420: When the master eNodeB is synchronous with the secondary eNodeB, determine that a GAP length is a first length.

Specifically, the first length is 6 ms.

When the frame boundaries of the master eNodeB and the secondary eNodeB are synchronized, that is, in a synchronization scenario, it is determined that a measurement GAP length is 6 ms.

After the GAP length is determined, proceed to step 440.

Step 430: When frame boundaries of the master eNodeB and the secondary eNodeB are not synchronized, determine that a GAP length is a second length.

Specifically, the second length may be 7 ms or 8 ms.

When the frame boundaries of the master eNodeB and the secondary eNodeB are not synchronized, that is, in a non-synchronization scenario, if a calculation error of the SFN deviation is not considered, or a calculation error of the SFN deviation is not greater than a second threshold, for example, 0.5 ms, the second length may be 7 ms, that is, it is determined that a measurement GAP length is 7 ms; or if a calculation error of the SFN deviation is considered, and the calculation error of the SFN deviation is greater than a second threshold, the second length may be 8 ms, that is, it is determined that a measurement GAP length is 8 ms. After the GAP length is determined, proceed to step 440.

It should be noted that if a measurement GAP length is not considered for a synchronization scenario and a non-synchronization scenario respectively, the GAP length may be set to a maximum gap length to implement, in a dual connectivity scenario, that the UE receives and transmits radio frequency signals with the master eNodeB and the UE performs inter-frequency measurement on the secondary eNodeB. However, to ensure the inter-frequency measurement of the UE, the UE and a base station can be used only according to the maximum gap length, for example, 7 ms or 8 ms. Consequently, for a synchronization scenario in which a GAP length does not need to be extended, waste of a scheduling resource is caused. Using a GAP that is set to a period of 40 ms as an example, in a synchronization scenario, if a GAP length of 7 ms is used, a scheduling opportunity of 2.5% is wasted; or if a GAP length of 8 ms is used, a scheduling opportunity of 5% is wasted. However, if a GAP length of 6 ms is always used, for a non-synchronization scenario, if a GAP is set with reference to a time sequence of the master eNodeB, the secondary eNodeB may fail to perform scheduling when the UE performs measurement at some moments of a subframe.

Step 440: Send a message to user equipment UE to indicate the determined GAP length in the message.

Specifically, the master eNodeB or the secondary eNodeB that determines the GAP length indicates, by sending a radio resource control Protocol (RRC) message or a media access control (MAC) message to the UE, information about a selected GAP length in the message.

In the method for determining a measurement gap length provided in this embodiment of the present invention, a base station determines whether a master eNodeB and a secondary eNodeB are in a synchronization scenario, and further determines a GAP length selected for use when UE performs measurement. In the method, a case in which the master eNodeB is synchronous or not synchronous with the secondary eNodeB is fully considered in a dual connectivity scenario, so that an appropriate measurement GAP length can be determined based on a synchronization or non-synchronization scenario, which effectively avoids waste of a scheduling resource caused by selection of an inappropriate GAP length.

Embodiment 3

Figure 5:
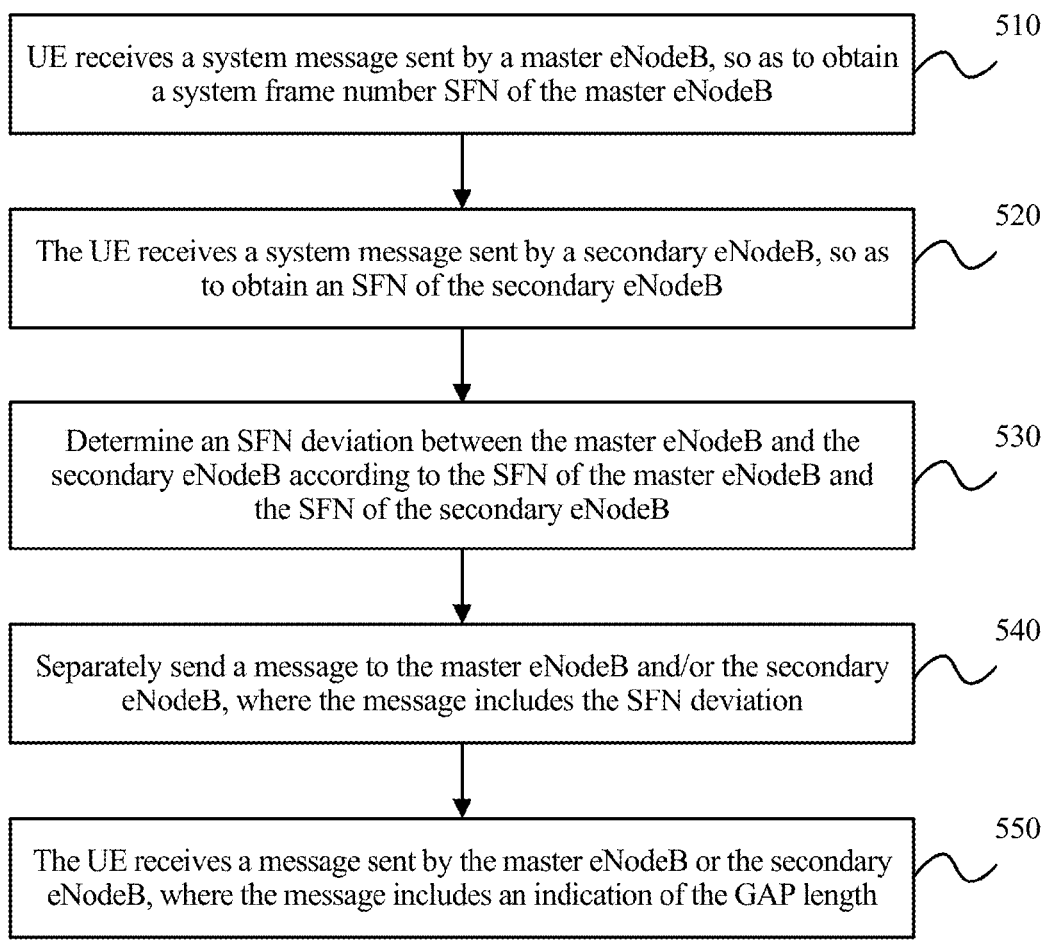
FIG. 5 is a flowchart of a method for determining a measurement gap length according to Embodiment 3 of the present invention.

Embodiment 3 of the present invention provides a method for determining a measurement gap length. FIG. 5 is a flowchart of a method for determining a measurement gap length according to an embodiment of the present invention. In this embodiment, the method is executed by UE that communicates with a master eNodeB and a secondary eNodeB in the foregoing Embodiment 2. The method specifically includes the following steps:

Step 510: UE receives a system message sent by a master eNodeB, so as to obtain a system frame number SFN of the master eNodeB.

Specifically, the SFN may be a sum of some SFNs implicitly obtained by performing decoding on a PBCH by the UE and some SFNs obtained from the system message. A specific process is the same as the foregoing S3-1, and details are not described herein again.

Step 520: The UE receives a system message sent by a secondary eNodeB, so as to obtain an SFN of the secondary eNodeB.

Optionally, whether the UE obtains the SFN of the secondary eNodeB may be determined according to an instruction of the master eNodeB.

In an example, if the master eNodeB learns that current network configuration is a non-synchronization scenario, the UE receives instruction information sent by the master eNodeB, so as to obtain the SFN of the secondary eNodeB according to the instruction information.

In another example, if the master eNodeB learns that current network configuration is a synchronization scenario, the master eNodeB does not send, to the UE, instruction information used for obtaining the SFN of the secondary eNodeB.

Step 530: Determine an SFN deviation between the master eNodeB and the secondary eNodeB according to the SFN of the master eNodeB and the SFN of the secondary eNodeB.

Specifically, after the UE obtains the SFN of the master eNodeB and the SFN of the secondary eNodeB, the UE calculates the SFN deviation between the master eNodeB and the secondary eNodeB.

Step 540: Separately send a message to the master eNodeB and/or the secondary eNodeB, where the message includes the SFN deviation.

Specifically, the UE respectively sends, to the master eNodeB and/or the secondary eNodeB, the SFN deviation obtained by means of calculation, and the master eNodeB and/or the secondary eNodeB determine/determines whether frame boundaries of the master eNodeB and the secondary eNodeB are synchronized according to an SFN deviation, and further determine/determines a GAP length.

Step 550: The UE receives a message sent by the master eNodeB or the secondary eNodeB, where the message includes an indication of the GAP length.

In the method for determining a measurement gap length provided in this embodiment of the present invention, UE obtains an SFN of a master eNodeB and an SFN of a secondary eNodeB, calculates an SFN deviation, and sends the SFN deviation to the master eNodeB or the secondary eNodeB, so that a base station determines whether the master eNodeB and the secondary eNodeB are in a synchronization scenario, and further determines a GAP length selected for use when UE performs measurement. In the method, a case in which the master eNodeB is synchronous or not synchronous with the secondary eNodeB is fully considered in a dual connectivity scenario, so that an appropriate measurement GAP length can be determined based on a synchronization or non-synchronization scenario, which effectively avoids waste of a scheduling resource caused by selection of an inappropriate GAP length.

Embodiment 4

Figure 6:
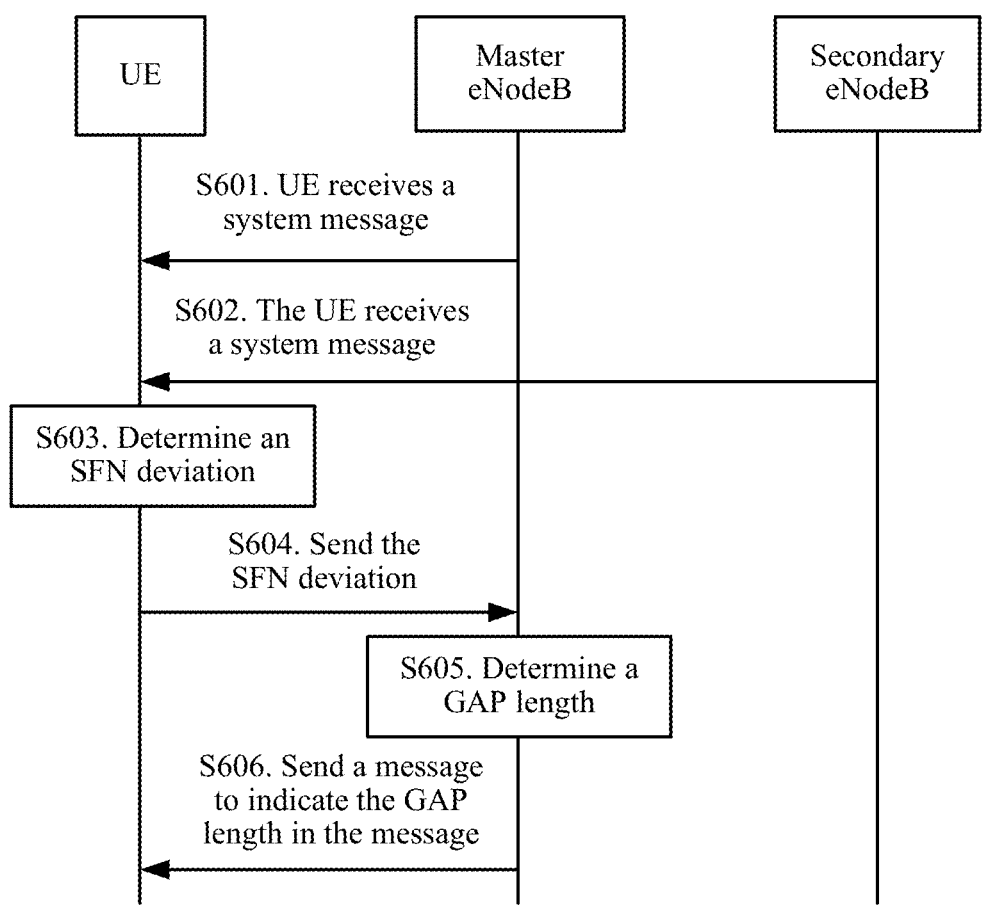
FIG. 6 is a signaling diagram of a method for determining a measurement gap length according to Embodiment 4 of the present invention.

The foregoing embodiment describes a process of a method for determining a measurement gap length by separately using a master eNodeB, a secondary eNodeB, or UE as an executor. Further, the implementation processes described in the foregoing Embodiment 2 and Embodiment 3 may be completed according to a signaling diagram shown in FIG. 6. FIG. 6 is a signaling diagram of a method for determining a measurement gap length provided in an embodiment of the present invention. As shown in FIG. 6, the method includes the following steps.

S601: UE receives a system message sent by a master eNodeB, so as to obtain an SFN of the master eNodeB.

S602: The UE receives a system message sent by a secondary eNodeB, so as to obtain an SFN of the secondary eNodeB.

S603: The UE determines an SFN deviation between the master eNodeB and the secondary eNodeB according to the SFN of the master eNodeB and the SFN of the secondary eNodeB.

S604: The UE separately sends a message to the master eNodeB and/or the secondary eNodeB, where the message includes the SFN deviation.

In another possible implementation solution, the SFN deviation may be calculated by the secondary eNodeB and sent to the master eNodeB.

S605: The master eNodeB determines whether frame boundaries of the master eNodeB and the secondary eNodeB are synchronized according to whether the SFN deviation is less than a first threshold, and further determines a GAP length.

Specifically, if it is in a synchronization scenario, the SFN deviation between the master eNodeB and the secondary eNodeB should be 0. Considering an effect caused by a system error, the SFN deviation may also be an excessively small deviation that is close to 0, for example, the foregoing first threshold, 30.26 μs. When the SFN deviation is less than the first threshold, it is determined that the frame boundaries of the master eNodeB and the secondary eNodeB are synchronized; or when the SFN deviation is not less than the first threshold, it is determined that the frame boundaries of the master eNodeB and the secondary eNodeB are not synchronized.

When the frame boundaries of the master eNodeB and the secondary eNodeB are synchronized, that is, in a synchronization scenario, it is determined that a measurement GAP length is 6 ms.

When the frame boundaries of the master eNodeB and the secondary eNodeB are not synchronized, that is, in a non-synchronization scenario, if a calculation error of the SFN deviation is not considered, or a calculation error of the SFN deviation is not greater than a second threshold, for example, 0.5 ms, the second length may be 7 ms, that is, it is determined that a measurement GAP length is 7 ms; or if a calculation error of the SFN deviation is considered, and the calculation error of the SFN deviation is greater than a second threshold, the second length may be 8 ms, that is, it is determined that a measurement GAP length is 8 ms.

S606: The master eNodeB sends a message to user equipment UE to indicate the determined GAP length in the message.

A specific execution process of the foregoing steps is separately described in the foregoing Embodiment 2 and Embodiment 3, and details are not described herein again.

It should be noted that in Embodiment 4, only a case in which the UE calculates an SFN deviation and a master eNodeB determines selection of a GAP length is used as an example for specific description. However, specific implementation processes of the methods for determining a measurement gap length that are provided in Embodiment 1 to Embodiment 3 of the present invention are not limited thereto.

Embodiment 5

Figure 7:
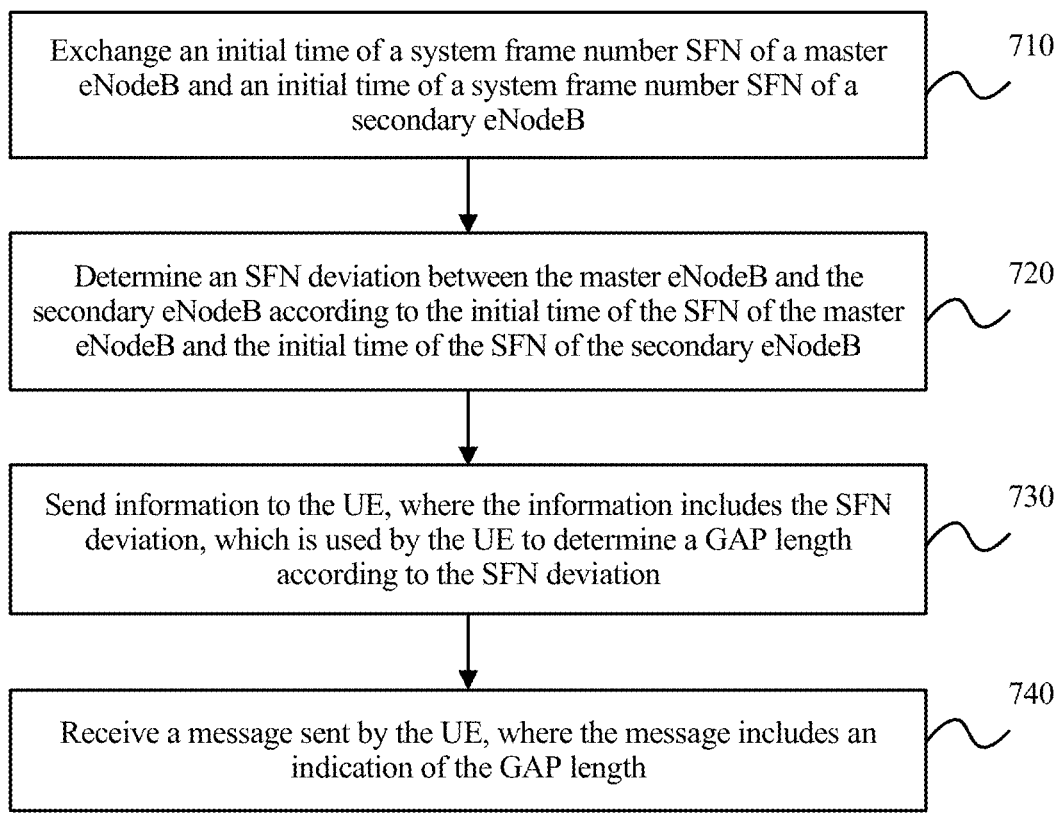
FIG. 7 is a flowchart of a method for determining a measurement gap length according to Embodiment 5 of the present invention.

Embodiment 5 of the present invention provides a method for determining a measurement gap length. FIG. 7 is a flowchart of a method for determining a measurement gap length according to an embodiment of the present invention. In this embodiment, the method is executed by a base station, which may be specifically a master eNodeB (MeNB) or a secondary eNodeB (SeNB). Unless specially noted in the following, the method provided in this embodiment of the present invention may be executed by either of the two base stations: the MeNB and the SeNB. The method specifically includes the following steps:

Step 710: Transfer an initial time of a system frame number SFN of a master eNodeB and an initial time of a system frame number SFN of a secondary eNodeB.

Specifically, on a network, transferring of an initial time of an SFN may be performed between the master eNodeB and the secondary eNodeB. By means of the transferring, the master eNodeB may obtain the initial time of the SFN of the secondary eNodeB, and the secondary eNodeB may obtain the initial time of the SFN of the master eNodeB.

Step 720: Determine an SFN deviation between the master eNodeB and the secondary eNodeB according to the initial time of the SFN of the master eNodeB and the initial time of the SFN of the secondary eNodeB.

Specifically, the SFN deviation between the master eNodeB and the secondary eNodeB may be calculated according to the obtained initial time of the SFN of the master eNodeB and the obtained initial time of the SFN of the secondary eNodeB.

Step 730: Send information to the UE, where the information includes the SFN deviation, which is used by the UE to determine a GAP length according to the SFN deviation.

Specifically, an SFN deviation obtained by means of calculation is sent to the UE, so that the UE may determine, according to the SFN deviation, whether network configuration is a synchronization scenario or a non-synchronization scenario, that is, whether frame boundaries of the master eNodeB and the secondary eNodeB are synchronized. Further, the UE may determine the GAP length according to the SFN deviation.

Step 740: Receive a message sent by the UE, where the message includes an indication of the GAP length.

Specifically, the UE may send an RRC message or a media access control MAC message to the master eNodeB or the secondary eNodeB, and indicates information about a selected GAP length in the message, so as to inform the master eNodeB or the secondary eNodeB of a GAP length selected by the UE.

In the method for determining a measurement gap length provided in this embodiment of the present invention, a master eNodeB or a secondary eNodeB, calculates an SFN deviation between the two base stations, and sends the SFN deviation to UE, so that the UE determines whether the master eNodeB and the secondary eNodeB are in a synchronization scenario, and further determines a GAP length selected for use when UE performs measurement. In the method, a case in which the master eNodeB is synchronous or not synchronous with the secondary eNodeB is fully considered in a dual connectivity scenario, so that an appropriate measurement GAP length can be determined based on a synchronization or non-synchronization scenario, which effectively avoids waste of a scheduling resource caused by selection of an inappropriate GAP length.

Embodiment 6

Figure 8:
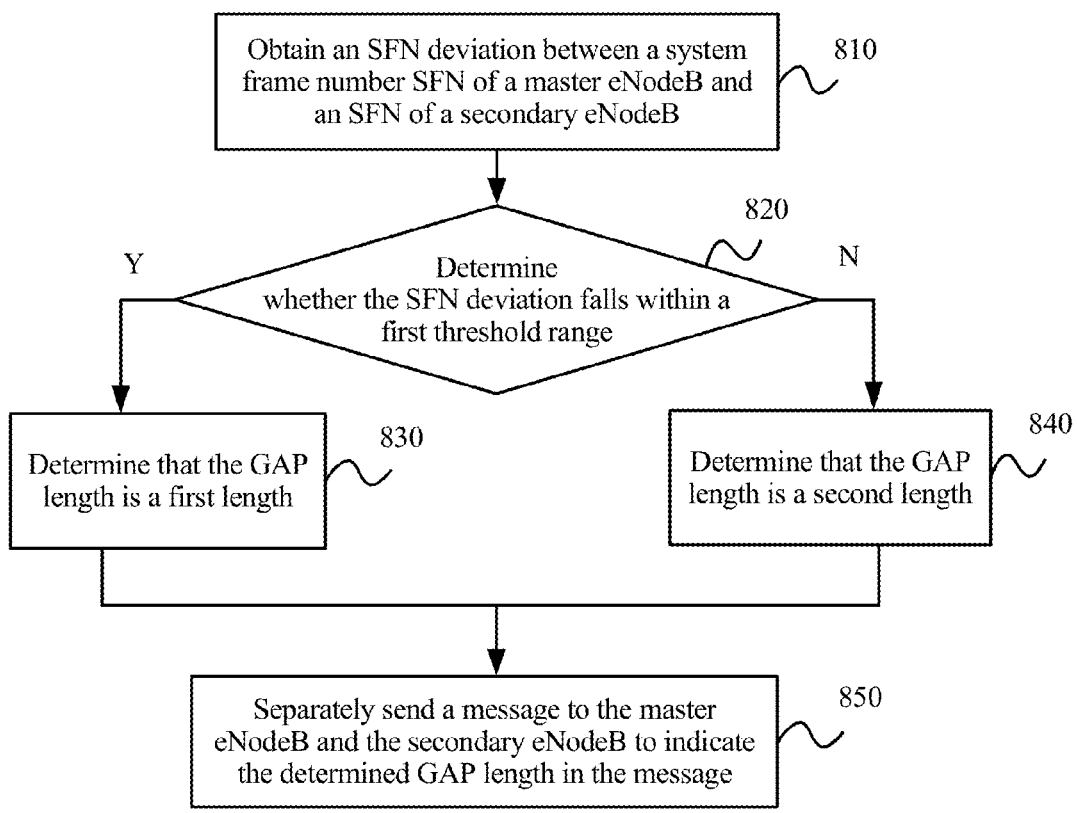
FIG. 8 is a flowchart of a method for determining a measurement gap length according to Embodiment 6 of the present invention.

Embodiment 6 of the present invention provides a method for determining a measurement gap length. FIG. 8 is a flowchart of a method for determining a measurement gap length according to an embodiment of the present invention. In this embodiment, the method is executed by UE that communicates with a master eNodeB and a secondary eNodeB in the foregoing Embodiment 5. The method specifically includes the following steps:

Step 810: Obtain an SFN deviation between a system frame number SFN of a master eNodeB and an SFN of a secondary eNodeB.

Specifically, UE receives information sent by the master eNodeB or the secondary eNodeB, so as to obtain the SFN deviation from the information.

Step 820: Determine whether the SFN deviation falls within a first threshold range.

Specifically, if it is in a synchronization scenario, the SFN deviation between the master eNodeB and the secondary eNodeB should be 0. Considering an error problem caused by a transmission delay, when the SFN deviation falls within the first threshold range, it can be considered that frame boundaries of the master eNodeB and the secondary eNodeB are synchronized, and step 830 is subsequently performed; or if the SFN deviation falls beyond the first threshold range, it is considered that frame boundaries of the master eNodeB and the secondary eNodeB are not synchronized, and step 840 is subsequently performed. Currently, the first threshold is generally 30.26 µs in the industry.

Step 830: When the SFN deviation falls within the first threshold range, determine that the GAP length is a first length.

Specifically, the first length is 6 ms.

When the frame boundaries of the master eNodeB and the secondary eNodeB are synchronized, that is, in a synchronization scenario, it is determined that a measurement GAP length is 6 ms.

After the GAP length is determined, proceed to step 850.

Step 840: When the SFN deviation falls beyond the first threshold range, determine that the GAP length is a second length.

Specifically, the second length may be 7 ms or 8 ms.

When the frame boundaries of the master eNodeB and the secondary eNodeB are not synchronized, that is, in a non-synchronization scenario, if a calculation error of the SFN deviation is not considered, or a calculation error of the SFN deviation is not greater than a second threshold, for example, 0.5 ms, the second length may be 7 ms, that is, it is determined that a measurement GAP length is 7 ms; or if a calculation error of the SFN deviation is considered, and the calculation error of the SFN deviation is greater than a second threshold, the second length may be 8 ms, that is, it is determined that a measurement GAP length is 8 ms. After the GAP length is determined, proceed to step 850.

It should be noted that if a measurement GAP length is not considered for a synchronization scenario and a non-synchronization scenario respectively, the GAP length may be set to a maximum gap length to implement, in a dual connectivity scenario, that the UE receives and transmits radio frequency signals with the master eNodeB and the UE performs inter-frequency measurement on the secondary eNodeB. However, to ensure the inter-frequency measurement of the UE, the UE and a base station can be used only according to the maximum gap length, for example, 7 ms or 8 ms. Consequently, for a synchronization scenario in which a GAP length does not need to be extended, waste of a scheduling resource is caused. Using a GAP that is set to a period of 40 ms as an example, in a synchronization scenario, if a GAP length of 7 ms is used, a scheduling opportunity of 2.5% is wasted; or if a GAP length of 8 ms is used, a scheduling opportunity of 5% is wasted. However, if a GAP of 6 ms is always used, for a non-synchronization scenario, if a GAP is set with reference to a time sequence of the master eNodeB, the secondary eNodeB may fail to perform scheduling when the UE performs measurement at some moments of a subframe.

Step 850: Separately send a message to the master eNodeB and the secondary eNodeB to indicate the determined GAP length in the message.

Specifically, the UE that determines the GAP length sends an RRC message or a MAC message to the master eNodeB and/or the secondary eNodeB, and indicates information about a selected GAP length in the message.

In the method for determining a measurement gap length provided in this embodiment of the present invention, UE determines whether a master eNodeB and a secondary eNodeB are in a synchronization scenario, and further determines a GAP length selected for use when UE performs measurement. In the method, a case in which the master eNodeB is synchronous or not synchronous with the secondary eNodeB is fully considered in a dual connectivity scenario, so that an appropriate measurement GAP length can be determined based on a synchronization or non-synchronization scenario, which effectively avoids waste of a scheduling resource caused by selection of an inappropriate GAP length.

Embodiment 7

Figure 9:
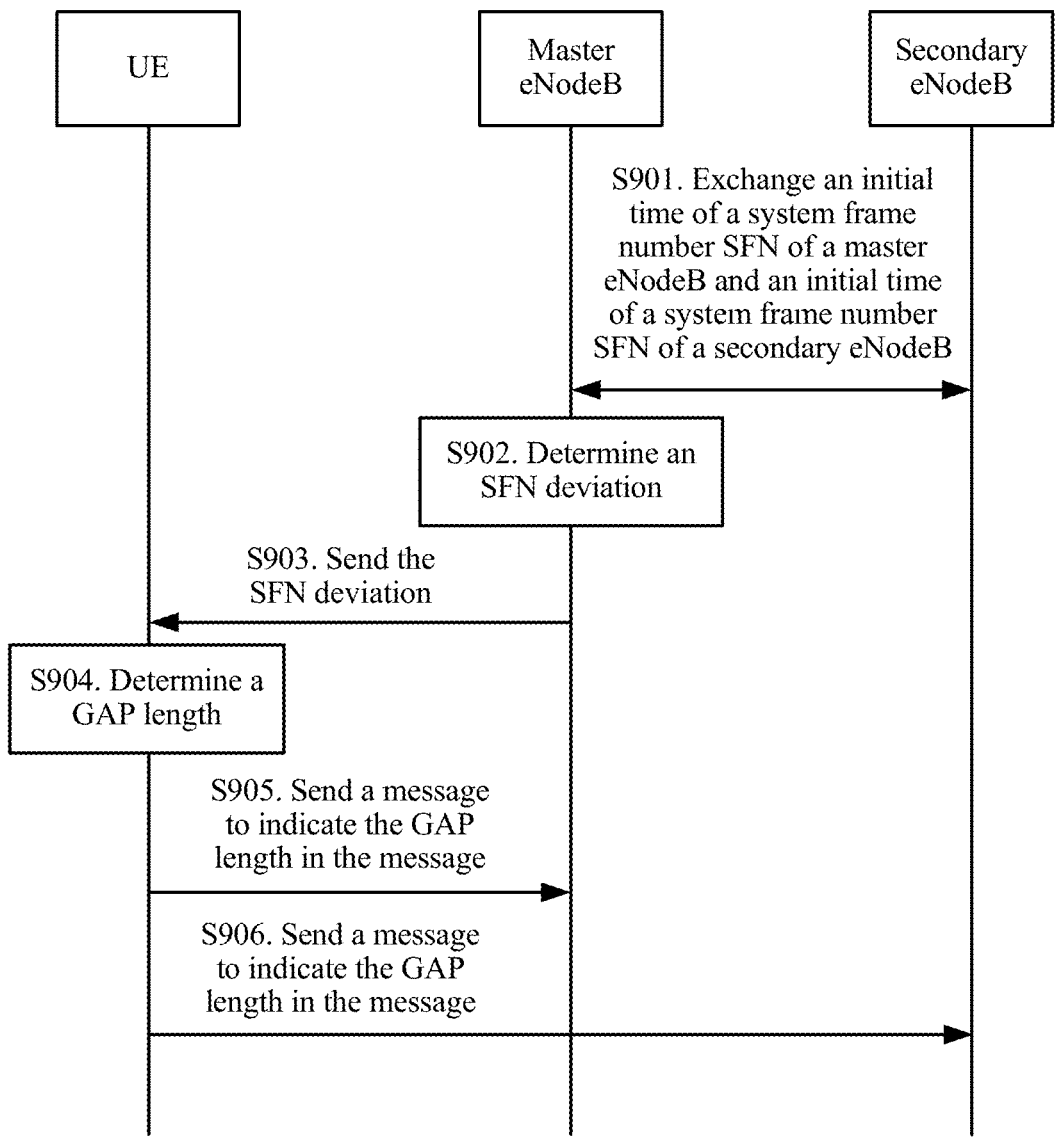
FIG. 9 is a signaling diagram of a method for determining a measurement gap length according to Embodiment 7 of the present invention.

The foregoing Embodiment 5 and Embodiment 6 describe a process of a method for determining a measurement gap length by separately using a master eNodeB, a secondary eNodeB, or UE as an executor. Further, the implementation processes described in the foregoing Embodiment 5 and Embodiment 6 may be completed according to a signaling diagram shown in FIG. 9. FIG. 9 is a signaling diagram of a method for determining a measurement gap length provided in an embodiment of the present invention. As shown in FIG. 9, the method specifically includes the following steps.

S901: A master eNodeB and a secondary eNodeB mutually transfer an initial time of a system frame number SFN of the master eNodeB and an initial time of a system frame number SFN of the secondary eNodeB.

S902: The master eNodeB determines an SFN deviation between the master eNodeB and the secondary eNodeB according to the initial time of the SFN of the master eNodeB and the initial time of the SFN of the secondary eNodeB.

S903: The master eNodeB sends information to UE, where the information includes the SFN deviation.

Specifically, in another possible implementation manner, the SFN deviation may be calculated by the secondary eNodeB and sent to the UE.

S904: The UE determines whether frame boundaries of the master eNodeB and the secondary eNodeB are synchronized according to whether the SFN deviation falls within a first threshold range; and further determines a GAP length.

When the SFN deviation falls within the first threshold range, it is determined that the frame boundaries of the master eNodeB and the secondary eNodeB are synchronized; or when the SFN deviation falls beyond the first threshold range, it is determined that the frame boundaries of the master eNodeB and the secondary eNodeB are not synchronized. The first threshold is preferably 30.26 μm.

When the frame boundaries of the master eNodeB and the secondary eNodeB are synchronized, that is, in a synchronization scenario, it is determined that a measurement GAP length is 6 ms.

When the frame boundaries of the master eNodeB and the secondary eNodeB are not synchronized, that is, in a non-synchronization scenario, if a calculation error of the SFN deviation is not considered, or a calculation error of the SFN deviation is not greater than a second threshold, for example, 0.5 ms, the second length may be 7 ms, that is, it is determined that a measurement GAP length is 7 ms; or if a calculation error of the SFN deviation is considered, and the calculation error of the SFN deviation is greater than a second threshold, the second length may be 8 ms, that is, it is determined that a measurement GAP length is 8 ms.

S905: The UE sends a message to the master eNodeB to indicate the determined GAP length in the message; and/or S906: The UE sends a message to the secondary eNodeB to indicate the determined GAP length in the message; or S907: The master eNodeB sends a message to the secondary eNodeB to indicate the determined GAP length in the message.

The foregoing step 905 and the foregoing step 906 may be concurrently performed; or step 906 is first performed, and then the step 905 is performed.

A specific execution process of the foregoing steps is separately described in the foregoing Embodiment 5 and Embodiment 6, and details are not described herein again.

It should be noted that in Embodiment 6, only a case in which a master eNodeB calculates an SFN deviation and sends the SFN deviation to the UE, so that the UE determines selection of a GAP length is used as an example for specific description. However, specific implementation processes of the methods for determining a measurement gap length that are provided in Embodiment 5 and Embodiment 6 of the present invention are not limited thereto.

Embodiment 8

Figure 10:
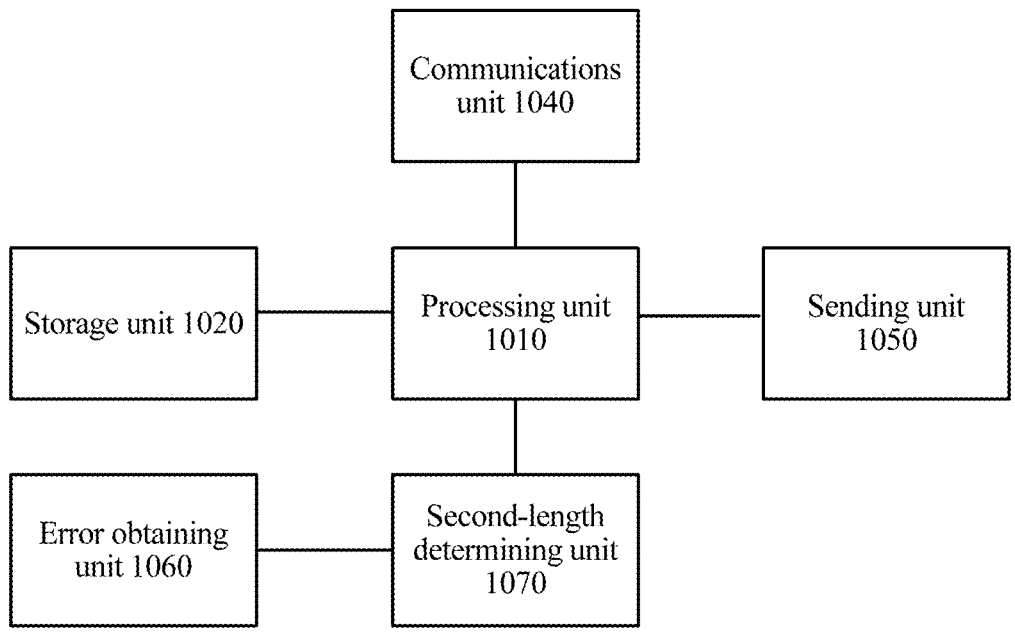
FIG. 10 is a schematic diagram of a network device according to Embodiment 8 of the present invention.

Correspondingly, an embodiment of the present invention provides a network device, which is configured to implement a method for determining a measurement gap length provided in the foregoing Embodiment 1. As shown in FIG. 10, the apparatus includes a processing unit 1010 and a storage unit 1020. The processing unit 1010 may be specifically implemented by a processor or a processing board, and the storage unit 1020 may be specifically implemented by a memory.

The processing unit 1010 is configured to:

determine whether a master eNodeB is synchronous with a secondary eNodeB; and when the master eNodeB is synchronous with the secondary eNodeB, determine that the GAP length is a first length; or when the master eNodeB is not synchronous with the secondary eNodeB, determine that the GAP length is a second length.

The first length is less than the second length; the first length is 6 ms; and the second length is 7 ms or 8 ms.

The storage unit 1020 is configured to store the GAP length.

In a first optional solution, the network device further includes: a communications unit (not shown in the figure;

only a second optional solution is shown in FIG. 10), configured to communicate with another network device, where the communications unit may be implemented by a transceiver, a receive and transmit circuit, or the like.

The processing unit 1010 is further configured to obtain, by using the communications unit (not shown in the figure), indication information that is used to indicate whether the master eNodeB is synchronous with the secondary eNodeB.

The processing unit 1010 is specifically configured to determine, according to the indication information, whether the master eNodeB is synchronous with the secondary eNodeB.

In a second optional solution, the processing unit 1010 is further configured to obtain SFN deviation information that is used to indicate a system frame number SFN deviation between the master eNodeB and the secondary eNodeB.

The processing unit 1010 is specifically configured to determine, according to the SFN deviation information, whether the SFN deviation meets a synchronization condition, where when the SFN deviation meets the synchronization condition, the master eNodeB is synchronous with the secondary eNodeB, or when the SFN deviation does not meet the synchronization condition, the master eNodeB is not synchronous with the secondary eNodeB.

Further, the first network device may be specifically the master eNodeB, the secondary eNodeB, or the UE; and the synchronization condition includes:

If the network device is the master eNodeB or the secondary eNodeB, the SFN deviation is 0; or if the network device is the UE, the SFN deviation is less than a first threshold.

Further, the processing unit 1010 is specifically configured to obtain the SFN deviation information according to an initial time of an SFN of the master eNodeB and an initial time of an SFN of the secondary eNodeB; or the network device further includes: a communications unit 1040, configured to communicate with another network device, where the communications unit 1040 may be implemented by a transceiver, a receive and transmit circuit, or the like.

The processing unit 1010 is specifically configured to obtain the SFN deviation information from the another network device by using the communications unit 1040, and the SFN deviation information is obtained according to the SFN of the master eNodeB and the SFN of the secondary eNodeB.

Optionally, the network device further includes an error obtaining unit 1060 and a second-length determining unit 1070.

The error obtaining unit 1060 is configured to obtain a calculation error of the SFN deviation.

The second-length determining unit 1070 is configured to: when the calculation error of the SFN deviation is not greater than a second threshold, determine that the second length is 7 ms; or when the calculation error of the SFN deviation is greater than the second threshold, determine that the second length is 8 ms.

Optionally, the network device further includes a sending unit 1050.

When the network device is specifically the master eNodeB, the sending unit 1050 is configured to indicate the GAP length to the UE and/or the secondary eNodeB;

when the network device is specifically the secondary eNodeB, the sending unit 1050 is configured to indicate the GAP length to the UE and/or the master eNodeB; or when the network device is specifically the UE, the sending unit 1050 is configured to indicate the GAP length to the master eNodeB and/or the secondary eNodeB.

By using the apparatus for determining a measurement gap length provided in this embodiment of the present invention, whether a master eNodeB and a secondary eNodeB are in a synchronization scenario may be determined. A case in which the master eNodeB is synchronous or not synchronous with the secondary eNodeB is fully considered in a dual connectivity scenario, so that an appropriate measurement GAP length is determined based on a synchronization or non-synchronization scenario, which effectively avoids waste of a scheduling resource caused by selection of an inappropriate GAP length.

Embodiment 9

Figure 11:
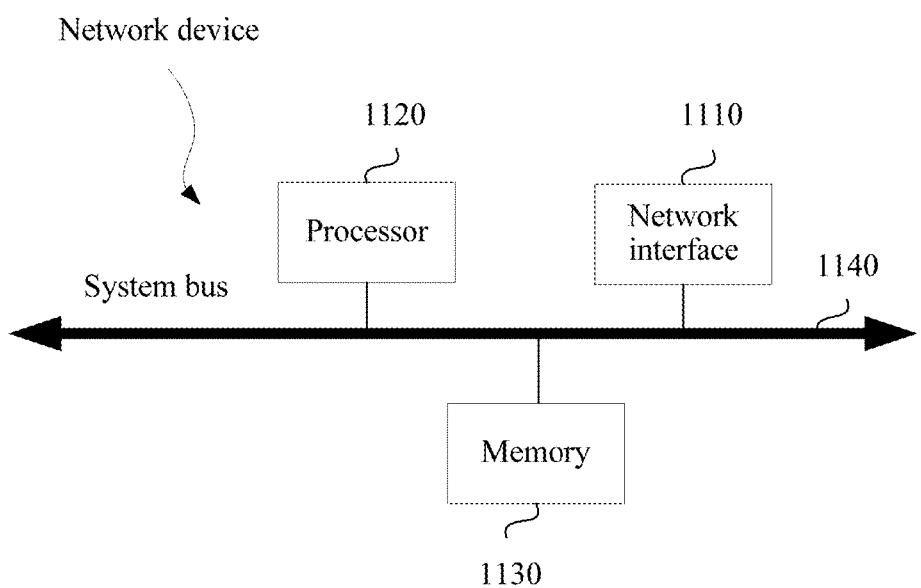
FIG. 11 is a schematic structural diagram of a network device according to Embodiment 9 of the present invention.

Correspondingly, an embodiment of the present invention provides a network device, which is configured to implement a method for determining a measurement gap length provided in the foregoing Embodiment 2. As shown in FIG. 11, the network device includes a network interface 1110, a processor 1120, and a memory 1130. A system bus 1140 is configured to connect the network interface 1110, the processor 1120, and the memory 1130. The network device of this embodiment may exist in a master eNodeB or a secondary eNodeB.

The network interface 1110 is configured to communicate with a terminal of the Internet of Things, an access gateway of the Internet of Things, a bearer network, a serving gateway of the Internet of Things, and an application server.

The processor 1120 may be a processor, or may be a general term of multiple processing elements. For example, the processor 1120 may be a central processing unit (CPU), or may be an application-specific integrated circuit (ASIC), or one or more integrated circuits configured to implement this embodiment of the present invention, for example, one or more micro-processors (digital signal processor, DSP) or one or more field programmable gate arrays (FPGA).

The memory 1130 may be a storage apparatus, or may be a general term of multiple storage elements, and is configured to store executable program code, or a parameter, data, and the like that are required for running of a base station. In addition, the memory 1130 may include a random access memory (RAM), and may further include a non-volatile memory, for example, a disk memory and a flash memory (Flash).

The system bus 1140 may be an Industry Standard Architecture (ISA) bus, a Peripheral Component Interconnect (PCI) bus, an Extended Industry Standard Architecture (EISA) bus, or the like. The system bus 1140 may be classified into an address bus, a data bus, a control bus, and the like. For convenience of denotation, the bus is represented by using only one thick line in FIG. 11; however, it does not indicate that there is only one bus or only one type of bus.

Upon startup, these software components are loaded into the memory 1130 and are then accessed by the processor 1120 to execute the following instructions:

determining whether the master eNodeB is synchronous with the secondary eNodeB; and when the master eNodeB is synchronous with the secondary eNodeB, determining that a GAP length is a first length; or when frame boundaries of the master eNodeB and the secondary eNodeB are not synchronized, determining that a GAP length is a second length, where the first length is 6 ms, and the second length is 7 ms or 8 ms; and sending a message to user equipment UE to indicate the determined GAP length in the message.

The application program includes the following instructions that can be used by the processor 1120 to determine whether the frame boundaries of the master eNodeB and the secondary eNodeB are synchronized:

obtaining configuration information of the master eNodeB and the secondary eNodeB; and determining whether the master eNodeB is synchronous with the secondary eNodeB according to the configuration information of the master eNodeB and the secondary eNodeB.

Optionally, the application program includes the following instructions that can be used by the processor 1120 to determine whether the master eNodeB is synchronous with the secondary eNodeB:

transferring an initial time of a system frame number SFN of the master eNodeB and an initial time of a system frame number SFN of the secondary eNodeB;

determining an SFN deviation between the master eNodeB and the secondary eNodeB according to the initial time of the SFN of the master eNodeB and the initial time of the SFN of the secondary eNodeB; and when the SFN deviation is 0 or is less than a first threshold, determining that the master eNodeB is synchronous with the secondary eNodeB; or when the SFN deviation is not 0 or is greater than a first threshold, determining that the master eNodeB is not synchronous with the secondary eNodeB.

Optionally, the application program includes the following instructions that can be used by the processor 1120 to determine whether the master eNodeB is synchronous with the secondary eNodeB:

receiving information sent by the UE, where the information includes an SFN deviation; and when the SFN deviation falls within a first threshold range, determining that the master eNodeB is synchronous with the secondary eNodeB; or when the SFN deviation falls beyond a first threshold range, determining that the master eNodeB is not synchronous with the secondary eNodeB.

Further, optionally, the application program further includes an instruction that can be used by the processor 1120 to perform the following process:

obtaining a calculation error of the SFN deviation, where
when the calculation error of the SFN deviation is not greater than a second threshold, the second length is 7 ms; or when the calculation error of the SFN deviation is greater than a second threshold, the second length is 8 ms.

By using the network device provided in this embodiment of the present invention, whether a master eNodeB and a secondary eNodeB are in a synchronization scenario may be determined. A case in which the master eNodeB is synchronous or not synchronous with the secondary eNodeB is fully considered in a dual connectivity scenario, so that an appropriate measurement GAP length is determined based on a synchronization or non-synchronization scenario, which effectively avoids waste of a scheduling resource caused by selection of an inappropriate GAP length.

Embodiment 10

Figure 12:
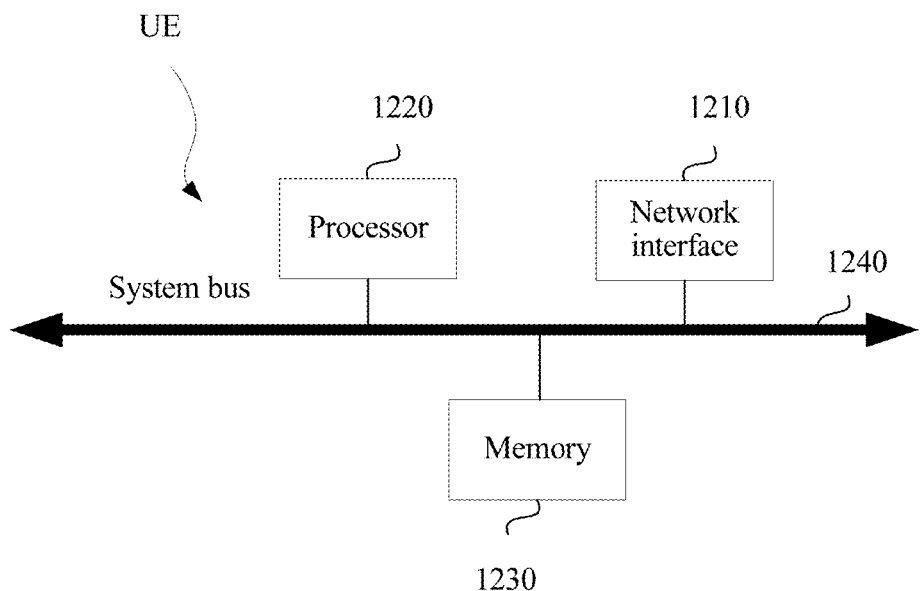
FIG. 12 is a schematic structural diagram of UE according to Embodiment 10 of the present invention.

Correspondingly, an embodiment of the present invention provides UE, which is configured to implement a method for determining a measurement gap length provided in the foregoing Embodiment 3. As shown in FIG. 12, the UE includes a network interface 1210, a processor 1220, and a memory 1230. A system bus 1240 is configured to connect the network interface 1210, the processor 1220, and the memory 1230.

The network interface 1210 is configured to communicate with a terminal of the Internet of Things, an access gateway of the Internet of Things, a bearer network, a serving gateway of the Internet of Things, and an application server.

The processor 1220 may be a processor, or may be a general term of multiple processing elements. For example, the processor 1220 may be a central processing unit (CPU), or may be an application-specific integrated circuit (ASIC), or one or more integrated circuits configured to implement this embodiment of the present invention, for example, one or more micro-processors (digital signal processor, DSP) or one or more field programmable gate arrays (FPGA).

The memory 1230 may be a storage apparatus, or may be a general term of multiple storage elements, and is configured to store executable program code, or a parameter, data, and the like that are required for running of a base station. In addition, the memory 1430 may include a random access memory (RAM), and may further include a non-volatile memory, for example, a disk memory and a flash memory (Flash).

The system bus 1240 may be an Industry Standard Architecture (ISA) bus, a Peripheral Component Interconnect (PCI) bus, an Extended Industry Standard Architecture (EISA) bus, or the like. The system bus 1240 may be classified into an address bus, a data bus, a control bus, and the like. For convenience of denotation, the bus is represented by using only one thick line in FIG. 12; however, it does not indicate that there is only one bus or only one type of bus.

Upon startup, these software components are loaded into the memory 1230 and are then accessed by the processor 1220 to execute the following instructions:

receiving a system message sent by a master eNodeB, so as to obtain a system frame number SFN of the master eNodeB;

receiving a system message sent by a secondary eNodeB, so as to obtain an SFN of the secondary eNodeB;

determining an SFN deviation between the master eNodeB and the secondary eNodeB according to the SFN of the master eNodeB and the SFN of the secondary eNodeB;

separately sending information to the master eNodeB and/or the secondary eNodeB, where the information includes the SFN deviation, and the master eNodeB and/or the secondary eNodeB determine/determines a GAP length according to the SFN deviation; and receiving a message sent by the master eNodeB or the secondary eNodeB, where the message includes an indication of the GAP length.

Optionally, before the UE receives a system message sent by the secondary eNodeB and obtains the SFN of the secondary eNodeB, the application program further includes instructions that can be used by the processor 1220 to perform the following process:

receiving instruction information sent by the master eNodeB; and obtaining the SFN of the secondary eNodeB according to the instruction information.

By using the UE provided in this embodiment of the present invention, an SFN deviation is calculated, so as to determine whether a master eNodeB and a secondary eNodeB are in a synchronization scenario. A case in which the master eNodeB is synchronous or not synchronous with the secondary eNodeB is fully considered in a dual connectivity scenario, so that an appropriate measurement GAP length is determined based on a synchronization or non-synchronization scenario, which effectively avoids waste of a scheduling resource caused by selection of an inappropriate GAP length.

Embodiment 11

Figure 13:
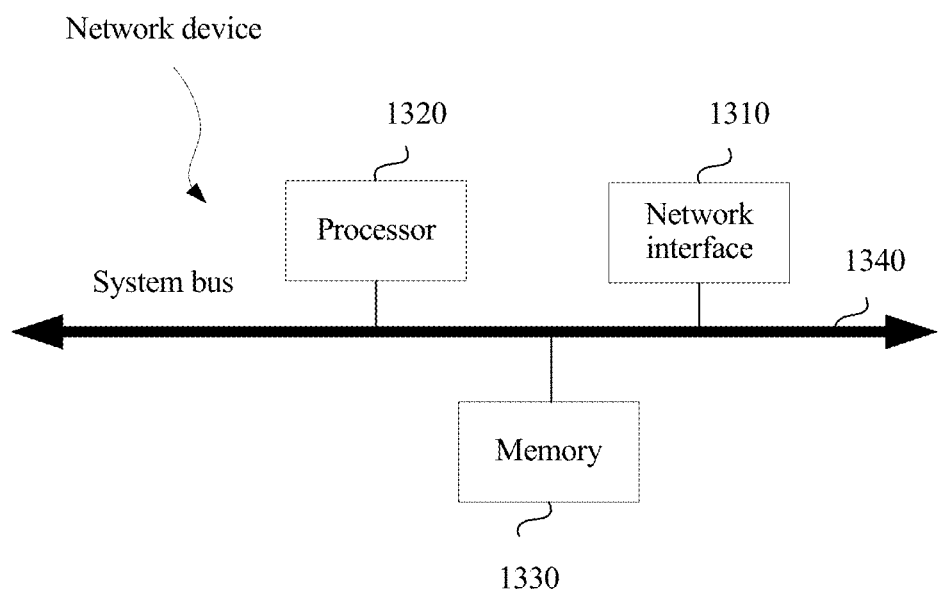
FIG. 13 is a schematic structural diagram of a network device according to Embodiment 11 of the present invention.

Correspondingly, an embodiment of the present invention provides a network device, which is configured to implement a method for determining a measurement gap length provided in the foregoing Embodiment 5. As shown in FIG. 13, the network device includes a network interface 1310, a processor 1320, and a memory 1330. A system bus 1340 is configured to connect the network interface 1310, the processor 1320, and the memory 1330. The network device of this embodiment may exist in a master eNodeB or a secondary eNodeB.

The network interface 1310 is configured to communicate with a terminal of the Internet of Things, an access gateway of the Internet of Things, a bearer network, a serving gateway of the Internet of Things, and an application server.

The processor 1320 may be a processor, or may be a general term of multiple processing elements. For example, the processor 1320 may be a central processing unit (CPU), or may be an application-specific integrated circuit (ASIC), or one or more integrated circuits configured to implement this embodiment of the present invention, for example, one or more micro-processors (digital signal processor, DSP) or one or more field programmable gate arrays (FPGA).

The memory 1330 may be a storage apparatus, or may be a general term of multiple storage elements, and is configured to store executable program code, or a parameter, data, and the like that are required for running of a base station. In addition, the memory 1330 may include a random access memory (RAM), and may further include a non-volatile memory, for example, a disk memory and a flash memory (Flash).

The system bus 1340 may be an Industry Standard Architecture (ISA) bus, a Peripheral Component Interconnect (PCI) bus, an Extended Industry Standard Architecture (EISA) bus, or the like. The system bus 1340 may be classified into an address bus, a data bus, a control bus, and the like. For convenience of denotation, the bus is represented by using only one thick line in FIG. 13; however, it does not indicate that there is only one bus or only one type of bus.

Upon startup, these software components are loaded into the memory 1330 and are then accessed by the processor 1320 to execute the following instructions:

transferring an initial time of a system frame number SFN of the master eNodeB and an initial time of a system frame number SFN of the secondary eNodeB;

determining an SFN deviation between the master eNodeB and the secondary eNodeB according to the initial time of the SFN of the master eNodeB and the initial time of the SFN of the secondary eNodeB;

sending information to the UE, where the information includes the SFN deviation, which is used by the UE to determine a GAP length according to the SFN deviation; and receiving a message sent by the UE, where the message includes an indication of the GAP length.

By using the network device provided in this embodiment of the present invention, an SFN deviation is calculated, so as to determine whether a master eNodeB and a secondary eNodeB are in a synchronization scenario. A case in which the master eNodeB is synchronous or not synchronous with the secondary eNodeB is fully considered in a dual connectivity scenario, so that an appropriate measurement GAP length is determined based on a synchronization or non-synchronization scenario, which effectively avoids waste of a scheduling resource caused by selection of an inappropriate GAP length.

Embodiment 12

Figure 14:
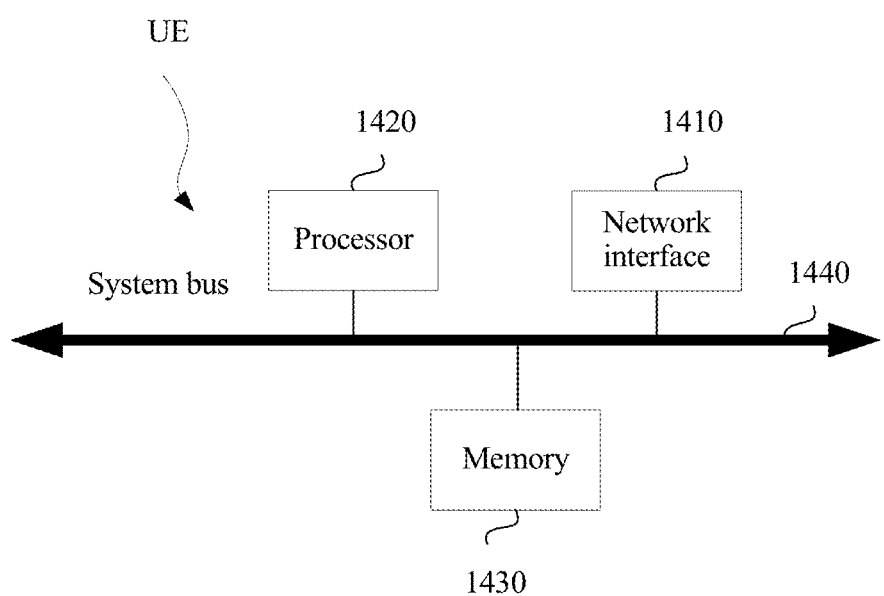
FIG. 14 is a schematic structural diagram of UE according to Embodiment 12 of the present invention.

Correspondingly, an embodiment of the present invention provides UE, which is configured to implement a method for determining a measurement gap length provided in the foregoing Embodiment 6. As shown in FIG. 14, the UE includes a network interface 1410, a processor 1420, and a memory 1430. A system bus 1440 is configured to connect the network interface 1410, the processor 1420, and the memory 1430.

The network interface 1410 is configured to communicate with a terminal of the Internet of Things, an access gateway of the Internet of Things, a bearer network, a serving gateway of the Internet of Things, and an application server.

The processor 1420 may be a processor, or may be a general term of multiple processing elements. For example, the processor 1420 may be a central processing unit (CPU), or may be an application-specific integrated circuit (ASIC), or one or more integrated circuits configured to implement this embodiment of the present invention, for example, one or more micro-processors (digital signal processor, DSP) or one or more field programmable gate arrays (FPGA).

The memory 1430 may be a storage apparatus, or may be a general term of multiple storage elements, and is configured to store executable program code, or a parameter, data, and the like that are required for running of a base station. In addition, the memory 1430 may include a random access memory (RAM), and may further include a non-volatile memory, for example, a disk memory and a flash memory (Flash).

The system bus 1440 may be an Industry Standard Architecture (ISA) bus, a Peripheral Component Interconnect (PCI) bus, an Extended Industry Standard Architecture (EISA) bus, or the like. The system bus 1440 may be classified into an address bus, a data bus, a control bus, and the like. For convenience of denotation, the bus is represented by using only one thick line in FIG. 14; however, it does not indicate that there is only one bus or only one type of bus.

Upon startup, these software components are loaded into the memory 1430 and are then accessed by the processor 1420 to execute the following instructions:

obtaining an SFN deviation between a system frame number SFN of a master eNodeB and an SFN of a secondary eNodeB;

when the SFN deviation falls within a first threshold range, determining that the GAP length is a first length; or when the SFN deviation falls beyond a first threshold range, determining that the GAP length is a second length, where the first length is 6 ms, and the second length is 7 ms or 8 ms; and separately sending a message to the master eNodeB and the secondary eNodeB to indicate the determined GAP length in the message.

Optionally, the application program further includes an instruction that can be used by the processor 1620 to perform the following process:

obtaining a calculation error of the SFN deviation, where
when the calculation error of the SFN deviation is not greater than a second threshold, the second length is 7 ms;

or when the calculation error of the SFN deviation is greater than a second threshold, the second length is 8 ms.

By using the UE provided in this embodiment of the present invention, an SFN deviation is calculated, so as to determine whether a master eNodeB and a secondary eNodeB are in a synchronization scenario. A case in which the master eNodeB is synchronous or not synchronous with the secondary eNodeB is fully considered in a dual connectivity scenario, so that an appropriate measurement GAP length is determined based on a synchronization or non-synchronization scenario, which effectively avoids waste of a scheduling resource caused by selection of an inappropriate GAP length.

A person skilled in the art may be further aware that, in combination with the examples described in the embodiments disclosed in this specification, units and algorithm steps may be implemented by electronic hardware. The foregoing has generally described compositions and steps of each example according to functions. The person skilled in the art may use different methods to implement the described functions for each particular application, but it should not be considered that the implementation goes beyond the scope of the embodiments of the present invention. Specifically, the calculation and control parts may be implemented by logical hardware, and the logical hardware may be a logical integrated circuit manufactured by an integrated circuit process, which is not limited in the present invention.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objectives, technical solutions, and benefits of the embodiments of the present invention are further described in detail. It should be understood that the foregoing descriptions are merely specific implementation manners of the embodiments of the present invention, but are not intended to limit the protection scope of the embodiments of present invention. Any modification, equivalent replacement, or improvement made without departing from the principle of the embodiments of the present invention shall fall within the protection scope of the embodiments of the present invention.

What is claimed is:

1. A method for determining a measurement gap length, the method comprising:
   determining, by a first network device, whether a master eNodeB is synchronous with a secondary eNodeB;
   when the master eNodeB is synchronous with the secondary eNodeB, determining, by the first network device, that the measurement gap length is a first length; and
   when the master eNodeB is not synchronous with the secondary eNodeB, determining, by the first network device, that the measurement gap length is a second length that is greater than the first length.

2. The method according to claim 1, further comprising:
   obtaining, by the first network device, indication information that is used to indicate whether the master eNodeB is synchronous with the secondary eNodeB; and
   wherein determining, by a first network device, whether a master eNodeB is synchronous with a secondary eNodeB comprises:
   determining, by the first network device according to the indication information, whether the master eNodeB is synchronous with the secondary eNodeB.

3. The method according to claim 1, further comprising: obtaining, by the first network device, system frame number (SFN) deviation information that is used to indicate a SFN deviation between the master eNodeB and the secondary eNodeB; and wherein determining, by a first network device, whether a master eNodeB is synchronous with a secondary eNodeB comprises:
   determining, by the first network device according to the SFN deviation information, whether the SFN deviation meets a synchronization condition, wherein when the SFN deviation meets the synchronization condition, the master eNodeB is synchronous with the secondary eNodeB, or when the SFN deviation does not meet the synchronization condition, the master eNodeB is not synchronous with the secondary eNodeB.

4. The method according to claim 3, wherein the synchronization condition comprises:
   the SFN deviation is 0; or
   the SFN deviation is less than a first threshold.

5. The method according to claim 3, wherein obtaining, by the first network device, the SFN deviation information that is used to indicate the SFN deviation between the master eNodeB and the secondary eNodeB comprises:
   obtaining, by the first network device, the SFN deviation information according to an initial time of an SFN of the master eNodeB and an initial time of an SFN of the secondary eNodeB; or
   obtaining, by the first network device, the SFN deviation information from a second network device, wherein the SFN deviation information is obtained according to an initial time of an SFN of the master eNodeB and an initial time of an SFN of the secondary eNodeB.

6. The method according to claim 3, further comprising:
   obtaining, by the first network device, a calculation error of the SFN deviation; and
   when the calculation error of the SFN deviation is not greater than a second threshold, the second length is 7 ms or 8 ms.

7. The method according to claim 1, wherein:
   the first network device is the master eNodeB, the secondary eNodeB, or user equipment (UE).

8. The method according to claim 7, wherein:
   when the first network device is the master eNodeB, the method further comprises indicating, by the first network device, the measurement gap length to at least one of the UE or the secondary eNodeB;
   when the first network device is the secondary eNodeB, the method further comprises indicating, by the first network device, the measurement gap length to at least one of the UE or the master eNodeB; and
   when the first network device is the UE, the method further comprises indicating, by the first network device, the measurement gap length to at least one of the master eNodeB or the secondary eNodeB.

9. The method according to claim 1, wherein the synchronization comprises frame boundary synchronization.

10. The method according to claim 1, wherein the first length is 6 milliseconds (ms), and the second length is 7 ms or 8 ms.

11. A network device, comprising:
a processing unit configured to:
determine whether a master eNodeB is synchronous with a secondary eNodeB,
when the master eNodeB is synchronous with the secondary eNodeB, determine that a measurement gap length is a first length, and
when the master eNodeB is not synchronous with the secondary eNodeB, determine that a measurement gap length is a second length that is greater than the first length; and
a storage unit configured to store the measurement gap length.

12. The network device according to claim 11, further comprising:
a transceiver configured to communicate with another network device; and
wherein the processing unit is further configured to:
obtain, using the transceiver, indication information that is used to indicate whether the master eNodeB is synchronous with the secondary eNodeB; and
determine, according to the indication information, whether the master eNodeB is synchronous with the secondary eNodeB.

13. The network device according to claim 11, wherein the processing unit is further configured to:
obtain system frame number (SFN) deviation information that is used to indicate a SFN deviation between the master eNodeB and the secondary eNodeB; and
determine, according to the SFN deviation information, whether the SFN deviation meets a synchronization condition, wherein when the SFN deviation meets the synchronization condition, the master eNodeB is synchronous with the secondary eNodeB, or when the SFN deviation does not meet the synchronization condition, the master eNodeB is not synchronous with the secondary eNodeB.

14. The network device according to claim 13, wherein the synchronization condition comprises:
the SFN deviation is 0; or
the SFN deviation is less than a first threshold.

15. The network device according to claim 13, further comprising:
a transceiver configured to communicate with another network device; and
wherein the processing unit is configured to:
obtain the SFN deviation information according to an initial time of an SFN of the master eNodeB and an initial time of an SFN of the secondary eNodeB, or
obtain the SFN deviation information from the another network device using the transceiver, and the SFN deviation information is obtained according to an initial time of an SFN of the master eNodeB and an initial time of an SFN of the secondary eNodeB.

16. The network device according to claim 13, further comprising:
an error obtaining unit configured to obtain a calculation error of the SFN deviation; and
a second-length determining unit configured to:
when the calculation error of the SFN deviation is not greater than a second threshold, determine that the second length is 7 ms; and
when the calculation error of the SFN deviation is greater than a second threshold, determine that the second length is 8 ms.

17. The network device according to claim 11, wherein the network device is the master eNodeB, the secondary eNodeB, or user equipment (UE).

18. The network device according to claim 17, further comprising:
a transceiver; and
when the network device is the master eNodeB, the transceiver is configured to indicate the measurement gap length to at least one of the UE or the secondary eNodeB;
when the network device is the secondary eNodeB, the transceiver is configured to indicate the measurement gap length to at least one of the UE or the master eNodeB; and
when the network device is the UE, the transceiver is configured to indicate the measurement gap length to at least one of the master eNodeB or the secondary eNodeB.

19. The network device according to claim 11, wherein the synchronization comprises frame boundary synchronization.

20. The network device according to claim 11, wherein the first length is 6 millimeters (ms) and the second length is 7 ms or 8 ms.

21. A method for determining a measurement gap length, the method comprising:
obtaining, by a first network device, system frame number (SFN) deviation information that is used to indicate an SFN deviation between a master eNodeB and a secondary eNodeB;
determining, by the first network device, whether the master eNodeB is synchronous with the secondary eNodeB based on the SFN deviation;
obtaining, by the first network device, a calculation error of the SFN deviation;
when the master eNodeB is synchronous with the secondary eNodeB and the SFN deviation is less than a first threshold, determining, by the first network device, that the measurement gap length is a first length;
when the master eNodeB is not synchronous with the secondary eNodeB, the SFN deviation is not less than the first threshold, and the calculation error is not greater than a second threshold, determining, by the first network device, that the measurement gap length is a second length that is greater than the first length; and
when the master eNodeB is not synchronous with the secondary eNodeB, the SFN deviation is greater than the second threshold, and the calculation error is greater than the second threshold, determining, by the first network device, that the measurement gap length is a third length that is greater than the second length.

* * * * *

UNITED STATES PATENT AND TRADEMARK OFFICE
CERTIFICATE OF CORRECTION

| | |
|---|---|
| PATENT NO. | : 10,278,147 B2 |
| APPLICATION NO. | : 15/416759 |
| DATED | : April 30, 2019 |
| INVENTOR(S) | : Zeng et al. |

It is certified that error appears in the above-identified patent and that said Letters Patent is hereby corrected as shown below:

In the Specification

In Column 8, Line 19, delete "abase" and insert -- a base --, therefor.

Signed and Sealed this
Sixth Day of September, 2022

Katherine Kelly Vidal
*Director of the United States Patent and Trademark Office*